US008060729B1

(12) United States Patent
Perry et al.

(10) Patent No.: US 8,060,729 B1
(45) Date of Patent: Nov. 15, 2011

(54) SOFTWARE BASED DATA FLOWS ADDRESSING HARDWARE BLOCK BASED PROCESSING REQUIREMENTS

(75) Inventors: Steven Perry, High Wycombe (GB); Martin Roberts, Marlow (GB); Kellie Marks, Lane End (GB)

(73) Assignee: Altera Corporation, San Jose, CA (US)

( * ) Notice: Subject to any disclaimer, the term of this patent is extended or adjusted under 35 U.S.C. 154(b) by 484 days.

(21) Appl. No.: 12/244,904

(22) Filed: Oct. 3, 2008

(51) Int. Cl.
*G06F 9/00* (2006.01)
(52) U.S. Cl. ...................................... 712/225
(58) Field of Classification Search .................. None
See application file for complete search history.

(56) References Cited

U.S. PATENT DOCUMENTS

| | | | | |
|---|---|---|---|---|
| 4,918,686 A * | 4/1990 | Hayashi et al. | ............... | 370/413 |
| 6,128,307 A * | 10/2000 | Brown | ......................... | 370/412 |
| 6,925,641 B1 * | 8/2005 | Elabd | ............................. | 718/101 |
| 6,959,376 B1 * | 10/2005 | Boike et al. | ..................... | 712/35 |
| 7,000,039 B2 * | 2/2006 | Ishibashi | ......................... | 710/74 |
| 7,152,151 B2 * | 12/2006 | Smith | ............................. | 712/35 |
| 7,461,236 B1 | 12/2008 | Wentzlaff | | |
| 7,710,146 B1 * | 5/2010 | Egner et al. | ..................... | 326/38 |
| 7,746,862 B1 * | 6/2010 | Zuk et al. | ......................... | 370/392 |
| 7,805,593 B1 * | 9/2010 | Donlin | ......................... | 712/227 |
| 2002/0064154 A1 | 5/2002 | Sharma et al. | | |
| 2002/0097679 A1 | 7/2002 | Berenbaum | | |
| 2003/0009651 A1 * | 1/2003 | Najam et al. | ..................... | 712/34 |
| 2003/0172249 A1 | 9/2003 | Ganapathy et al. | | |
| 2004/0049613 A1 | 3/2004 | Kim et al. | | |
| 2004/0158573 A1 | 8/2004 | Bradley et al. | | |
| 2005/0249185 A1 | 11/2005 | Poor et al. | | |
| 2006/0179156 A1 * | 8/2006 | Eatherton et al. | ............. | 709/238 |
| 2007/0053356 A1 | 3/2007 | Konda | | |
| 2008/0005546 A1 * | 1/2008 | Wang et al. | .................. | 712/244 |
| 2008/0059765 A1 * | 3/2008 | Svendsen et al. | ............... | 712/34 |

OTHER PUBLICATIONS

Hauser, J.R., et al., "Garp: A MIPS Processor with a Reconfigurable Coprocessor", *Proceedings of the IEEE Symposium on Field-Programmable Custom Computing Machines* (FCCM '97, Apr. 16-18, 1997), pp. 24-33.

* cited by examiner

*Primary Examiner* — Eric Coleman
(74) *Attorney, Agent, or Firm* — Ropes & Gray LLP; Jeffrey H. Ingerman (57) ABSTRACT

In the provided architecture, one or more multi-threaded processors may be combined with hardware blocks having increased functionality. Each hardware block may be able to transfer a data packet to a particular hardware block based on the packet being processing. One or more hardware block may also be able to divide packets into subpackets for separate processing, and other hardware blocks may be able to rejoin the subpackets. Hardware blocks may also be able to transfer packet information between other hardware blocks during the processing sequence.

28 Claims, 7 Drawing Sheets

SOFTWARE BASED DATA FLOWS ADDRESSING HARDWARE BLOCK BASED PROCESSING REQUIREMENTS

BACKGROUND OF THE INVENTION

The present invention relates to datapath processing—for example, to apparatus and methods for high-performance datapath processing. The present invention is particularly useful for programmable integrated circuit devices, such as programmable logic devices (PLDs).

Many modern processing applications (e.g., packet processing, digital signal processing, or digital image processing) require both high performance and high flexibility. Existing processing devices, however, typically provide inflexible pipeline architectures that have several shortcomings. For example, pipelined processing devices are limited in their speed. To guarantee that each stage executes properly, a pipelined device can only operate as fast as the slowest stage of the pipeline. Moreover, such pipelines typically operate in a sequential manner, whereby each unit of data must pass through each stage of the pipeline regardless of processing variables (e.g., the type of data or the mode of operation). This inflexibility can cause inefficiencies and delays. While some systems attempt to provide both the performance of hardware with dedicated hardware blocks, and the flexibility of software with a processor, these systems are often limited by the inflexible nature of the dedicated hardware blocks. Moreover, the inflexible nature of the hardware blocks typically requires extensive design efforts to develop each data processing sequence.

SUMMARY OF THE INVENTION

The present invention provides improved apparatus, systems, and methods for processing data packets. It is to be noted that while the term "packet" can be used to refer to units of data in a computer network, it is to be interpreted herein as meaning any unit of data that can be processed. The term "packet information" as used herein may be used to refer to any portion of a packet that can be indicative of a packet's characteristics (e.g., type, status, origin, destination, beginning, or end). "Packet information" may include, for example, any portion of a packet's header, including the entire header. In addition, "packet information" may include all or a portion of a packet's payload. In some embodiments with suitably sized packets, "packet information" can include a whole packet. Although the foregoing examples of packet information are examples of information carried as part of the packet being characterized, packet information also may be data outside the packet that can be indicative of a packet's characteristics. For example, "packet information" may include data that is generated during a packet's processing sequence such as parameters or status signals.

In the provided architecture, one or more multi-threaded processors may be combined with hardware blocks. The resulting combination allows for data packets to undergo a processing sequence having the flexibility of software programmability with the high performance of dedicated hardware. For example, a multi-threaded processor can control the high-level tasks of a processing sequence while hardware blocks handle the computationally intensive events (e.g., signal processing filters or matrix operations).

A multi-threaded processor can perform processor tasks during the processing sequence. Each processor task can be specified by software stored in the processor. One or more of the processor tasks can be based on packet information received by the processor. After performing a processor task, the processor can transfer packet information to a hardware block for further processing. A data processing apparatus can include interface circuitry to coordinate the transfer of packet information between the processor and the hardware blocks.

Each hardware block can be fixed or programmable. The fixed hardware blocks can provide higher performance, but the programmable hardware blocks can be more flexible. Using programmable hardware blocks in a data processing apparatus allows for increased flexibility when developing data processing sequences. In order to balance performance with flexibility, a combination of fixed and programmable hardware blocks may be provided in a data processing apparatus.

Each hardware block can have one or more features to provide further flexibility when processing data packets. For example, a hardware block can include memory for storing packets. The hardware block may perform hardware events on a packet stored in memory within the block. In some embodiments, the memory can have the capacity to store two or more packets so that the memory can store one or more waiting packets while the hardware block processes another packet.

In some embodiments, each hardware block may be able to process a packet and then transfer the packet to one of the other hardware blocks for further processing. For example, a hardware block may select the next hardware block in the processing sequence based on the type of packet being processed or the content of the packet being processed. A hardware block may also transfer packet information to another hardware block before transferring the associated packet to that hardware block. In some embodiments, a hardware block may be able to divide a packet into two or more sub-packets and transfer each sub-packet to a different hardware block for processing.

Interface circuitry can be provided to control the transfer of packets and packet information between the hardware blocks. For example, interface circuitry can be coupled to each hardware block so that any hardware block can send a packet or an instance of packet information to another hardware block. The interface circuitry for transferring data between hardware blocks may be similar to, yet distinct from, the interface circuitry for transferring packet information between the processor and the hardware blocks.

In accordance with this disclosure, any portion of the provided data processing apparatus can be provided on a programmable integrated circuit device such as a programmable logic device (PLD).

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

As described above, a data processing apparatus can combine the flexibility of software programmability with the high-performance of hardware in a scalable architecture.

The invention will now be described with reference to FIGS. 1-5.

Figure 1:
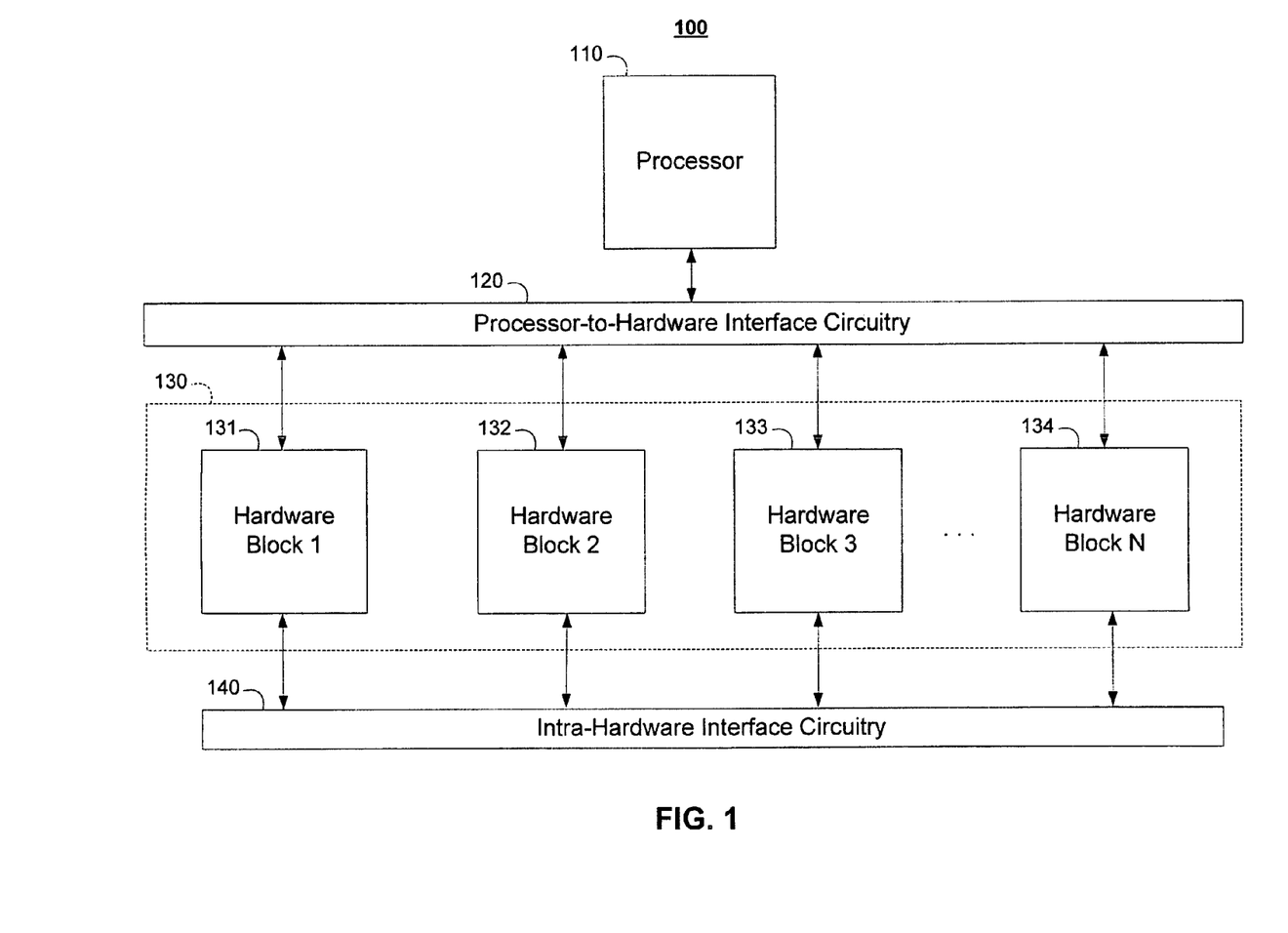
FIG. 1 is a simplified block diagram of a data processing apparatus in accordance with this disclosure.

FIG. 1 shows a data processing apparatus 100 in accordance with this disclosure. Apparatus 100 can include processor 110, processor-to-hardware interface circuitry 120, hardware blocks 130, and intra-hardware interface circuitry 140. Apparatus 100 can process successive data packets concurrently, meaning that apparatus 100 can begin processing subsequent packets before it has finished processing an earlier packet. At any given time, apparatus 100 may be processing a plurality of packets and each packet may be at a different stage in the processing sequence.

Processor 110 can be any logic, mechanism, or device that supports an instruction set. Processor 110 can support a complex instruction set computing (CISC) instruction set, a reduced instruction set computing (RISC) instruction set, or any of a variety of other instruction sets. Processor 110 can be loaded with a software program that controls the processing sequence of data packets. The software program can include instructions for the processor to execute as processor tasks in a processing sequence.

The software program can also include instructions for transferring packet information to a hardware block (e.g., hardware block 131, 132, 133, or 134). Such instructions can specify what the packet information includes and which hardware block to transfer the packet information to. The transfer of packet information from a processor to a hardware block can be based at least on a previous processor task. For example, packet information can include data calculated during a previous processor task. In some embodiments, packet information can include one or more parameters defining how a hardware event is to be performed. A hardware block can then use such parameters to configure itself for a hardware event.

In accordance with this disclosure, processor 110 is a multithreaded processor that is configured to support a number of threads using context switching. In one embodiment, processor 110 can process each thread for a single clock cycle before context switching to process a next thread (e.g., time-slicing). A detailed description of multithreaded processors can be found in copending, commonly-assigned U.S. patent application Ser. No. 10/728,032, filed Dec. 3, 2003, which is hereby incorporated by reference herein in its entirety.

Processor-to-hardware interface circuitry 120 can facilitate the transfer of packet information between processor 110 and hardware blocks 130. Processor-to-hardware interface circuitry 120 can include an input controller (not shown) to ensure that packet information is not sent to processor 110 when the processor is busy. Processor-to-hardware interface circuitry 120 can also include an input controller (not shown) to control the transfer of packet information to processor 110 and an output controller (not shown) to control the transfer of packet information to hardware blocks 130. Processor-to-hardware interface circuitry 120 can include memory (e.g., one or more registers) for storing data being transferred between processor 110 and one of hardware blocks 130. A detailed description of some embodiments of processor-to-hardware interface circuitry 120 can be found in the discussion regarding interface circuitry within copending, commonly-assigned U.S. patent application Ser. No. 12/150,889, filed Apr. 30, 2008, which is hereby incorporated by reference herein in its entirety.

In some embodiments, processor-to-hardware interface circuitry 120 can be a ring of registers for transferring information between processor 110 and one of hardware blocks 130. For example, processor-to-hardware interface circuitry 120 can include a set of registers for each component (e.g., each processor and hardware block) coupled to the ring. The sets of registers can be arranged in a continuous ring so that data in each set of registers can be shifted to the next set of registers at a predetermined frequency until the data arrives at its destination. For example, a first component (e.g., processor 110 or one of hardware blocks 130) can transfer packet information to a second component (e.g., processor 110 or one of hardware blocks 130) by storing the packet information along with a destination address in the set of registers corresponding to the first component. The packet information and destination address can then shift around the ring until arriving at the set of registers corresponding to the second component. Upon arrival at the destination, the destination address stored in the set of registers will match and the interface circuitry can transfer the packet information out of the registers and into the second component. In this manner, any processor or hardware block can direct the transfer of data (e.g., a packet or an instance of packet information) to another processor or hardware block.

Hardware blocks 130 can perform hardware events on a packet or an instance of packet information. Various portions of a packet processing sequence can be implemented through hardware events. It may be advantageous to design a processing sequence such that the computationally intensive portions of the sequence are performed as hardware events. For example, packet processing sequences may use multiple look-up operations and complicated signal processing operations, such as Fast Fourier Transforms (FFTs) and finite-impulse response (FIR) filters, both of which can be implemented as hardware events. Using hardware blocks to perform these portions of a processing sequence can be much faster than performing the same operations using instructions running on a processor.

In accordance with some embodiments, hardware blocks 130 can include any number of hardware blocks (e.g., hardware block 131, hardware block 132, hardware block 133, and hardware block 134). Hardware blocks 130 can include any combination of logic gates and memory. In some embodiments, hardware blocks 130 may include an interface to external memory devices. The configuration of each hardware block can be specialized for the hardware event that it performs. In some embodiments, hardware blocks 130 can include a specialized processor for performing two or more hardware events. For example, hardware blocks 130 can include a digital signal processor for performing hardware events that involve signal processing.

Although hardware blocks 130 may be designed to perform a certain type of hardware event on a packet or an instance of packet information, the hardware blocks can be configurable such that the event is tailored to that particular situation. For example, one or more of hardware blocks 130 can accept packet information including parameters that further define the hardware event to be performed on a packet. Packet information used to configure a hardware block may, for example, be the result of a hardware event performed by another hardware block or a processor task performed by a processor. In some embodiments, a hardware block can perform a hardware event on an instance of packet information or some or all of the associated packet and then provide parameters in another instance of packet information to another hardware block (e.g., the next hardware block in that packet's processing sequence) based at least on the hardware event. Packet information including parameters can be transferred to hardware blocks 130 through intra-hardware interface circuitry 140. Hardware blocks 130 can be configured with default parameters such that a default set of parameters is used if no packet information is provided.

Intra-hardware interface circuitry 140 can be coupled with each of hardware blocks 130. Intra-hardware interface circuitry 140 can be used to transfer signals or data between hardware blocks 130. For example, intra-hardware interface circuitry 140 can facilitate the transfer of a data packet or an instance of packet information from one hardware block to another hardware block. Packet information transferred through intra-hardware interface circuitry 140 may include one or more parameters for configuring a hardware block or a status signal for initiating a hardware event.

Intra-hardware interface circuitry 140 may be a communications bus. In some embodiments, intra-hardware interface circuitry 140 can include a ring of registers for transferring data between hardware blocks. For example, each one of hardware blocks 130 can be coupled to a set of registers for transferring data. The ring of registers can be substantially similar in both form and function to processor-to-hardware interface circuitry 120, but without a set of registers corresponding to processor 110. Accordingly, the previous description of circuitry 120 and its operation can be generally applied to intra-hardware interface circuitry 140.

Hardware blocks 130 can include an input hardware block 131 and an output hardware block 134. Input hardware block 131 can be coupled to the input of apparatus 100 such that any new data packets first pass through block 131. Input hardware block 131 can be configured to perform a hardware event that prepares each packet for the processing sequence of apparatus 100. For example, input hardware block 131 can format a packet or generate initial packet information to prepare for the processing sequence.

Output hardware block 134 can be coupled to the output of apparatus 100. Output hardware block 134 can format a data packet for output from apparatus 100. Output block 134 can, for example, remove all pointers from a packet or delete all packet information once the processing sequence is complete. In some embodiments, output block 134 can serve as a buffer to control the rate at which data packets output from apparatus 100. For example, output block 134 can prevent data packets from outputting too fast.

Each hardware block can include memory for storing packet information or data packets. For example, each hardware block may include a memory circuit for storing packet information or data packets when the hardware block is performing a hardware event on that packet information or associated data packet. In some embodiments, a hardware block may include a memory circuit with the capacity to store two or more instances of packet information or data packets so that packet information or data packets waiting to be processed can be stored. A hardware block may assign a pointer to each instance of packet information or data packet. For example, a hardware block may assign pointers to identify each instance of packet information or packet stored in a memory circuit in the block. The pointers may also identify any associations between a packet and an instance of packet information.

In some embodiments, two or more hardware blocks 130 may share one memory circuit. For example, one hardware block may include a memory circuit and the memory circuit may used by other hardware blocks in addition to that hardware block. In some embodiments, an apparatus may include a shared memory circuit that is not included in any hardware block.

It is to be understood that, in a data processing apparatus in accordance with this disclosure, a processor (e.g., processor 110) can operate at a clock frequency that is different from the clock frequency at which hardware blocks (e.g., hardware blocks 130) operate. For example, processor 110 can operate at a higher frequency than hardware blocks 130. To account for the difference in frequencies, interface circuitry (e.g., processor-to-hardware interface circuitry 120) can operate at both frequencies by including some elements that operate at the frequency of the one or more processors and other elements that operate at the frequency of the hardware blocks.

It is to be further understood that any portion of a data processing apparatus (e.g., processor 110, processor-to-hardware interface circuitry 120, hardware blocks 130, or intra-hardware interface circuitry 140) can be incorporated into a programmable logic device (PLD) in accordance with this disclosure. In some embodiments, all portions of a data processing apparatus (e.g., apparatus 100) can be implemented on a single chip with programmable elements. Using programmable circuitry to form all or a portion of a data processing apparatus results in greater flexibility when developing data processing sequences. For example, a generic data processing apparatus can be provided, and the programmable portion of the apparatus can be programmed for a specific data processing sequence. As more of the data processing apparatus is provided in programmable circuitry, developing processing sequences becomes easier because the developer has to work around less fixed hardware. Moreover, the programmable portion of the apparatus can be reprogrammed multiple times for different data processing sequences. In some embodiments, a generic data processing apparatus can be provided in a complex system (e.g., a node in a communications network), the apparatus can be programmed for use with the system, the system can be deployed, and then the apparatus can be reprogrammed after the deployment. For example, an apparatus can be reprogrammed to conform to a new communications protocol or standard that is released after the apparatus is deployed. In this manner, programmability can allow for increased adaptability in a data processing apparatus.

Figure 2:
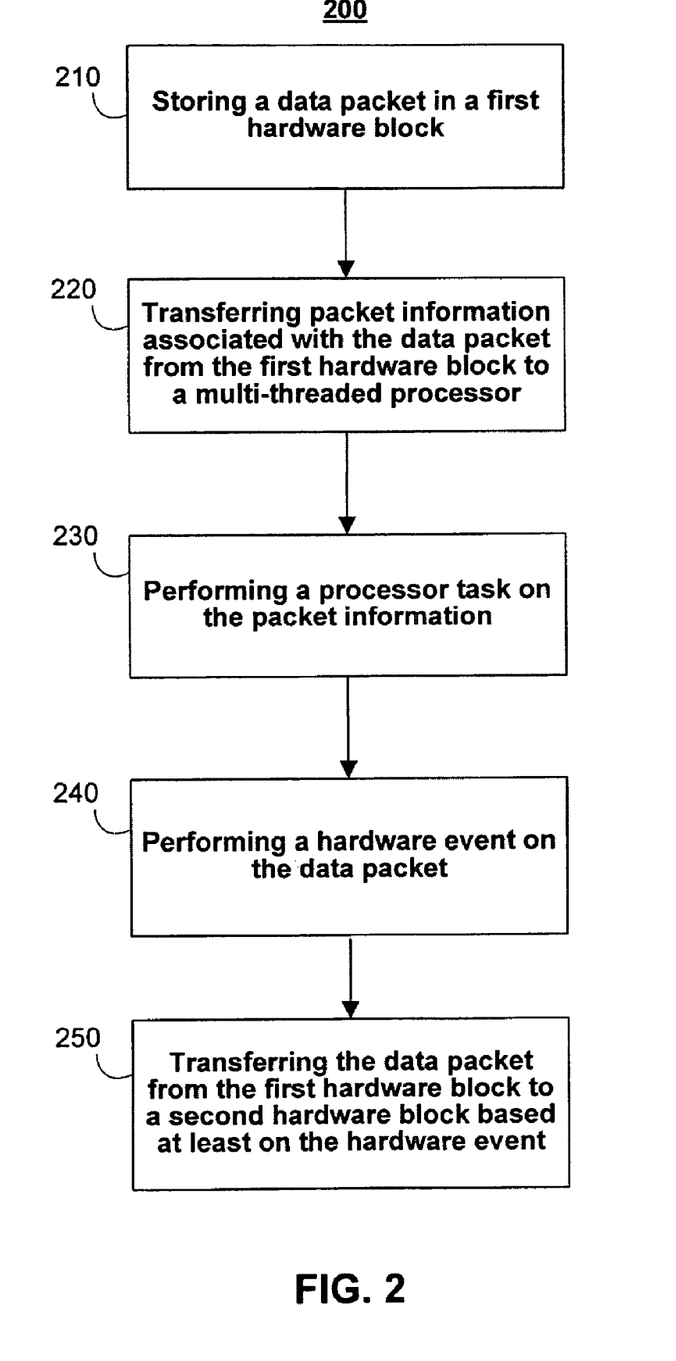
FIG. 2 is a flowchart of a data processing method in accordance with this disclosure.

FIG. 2 shows a flowchart of method 200 for processing a data packet in accordance with this disclosure. At step 210, a data packet can be stored in a first hardware block. The data packet can be stored in a memory circuit, which can be either exclusive or shared, within the hardware block.

At step 220, packet information associated with the data packet can be transferred from the first hardware block to a multi-threaded processor. The packet information can be transferred using interface circuitry (e.g., processor-to-hardware interface circuitry 120). The packet information may include data that is indicative of one or more packet characteristics (e.g., size or data type). The packet information may be generated by the first hardware block. For example, the first hardware block may derive the packet information from the packet.

In accordance with this disclosure, packet information can be transferred to a processor at any point during data processing. For example, any hardware block can generate packet information and transfer that packet information to a processor. In some embodiments, a hardware block can generate and transfer packet information to a processor based, at least partially, on a hardware event before the hardware event is completed.

At step 230, a processor task is performed on the packet information. The processor task can be performed by a processor (e.g., processor 110). The processor task can include one or more instructions from a software program. In some embodiments, the processor task can include identifying the type of packet associated with the packet information. In some embodiments, such as those where packet information is transferred to a processor before a corresponding hardware event is completed, a processor task may also begin before the hardware event is completed. The processor task may specify a next hardware event, for example, by identifying the corresponding hardware block. The process task may also specify a configuration for the corresponding hardware block.

At step 240, a hardware event is performed on the data packet. The hardware event can be performed by the first hardware block (e.g., one of hardware blocks 130). The hardware event may include computationally intense processing that can not be efficiently performed by a processor. The hardware event performed during step 240 may be based, at least partially, on the results of the processor task performed during step 230.

At step 250, the data packet is transferred from the first hardware block to a second hardware block based at least on the hardware event. Interface circuitry (e.g., intra-hardware interface circuitry 140) can be used to transfer the data packet. The first hardware block may specify the second hardware block based at least on the hardware event. For example, the first hardware block may specify the second hardware block based on the type of packet that the hardware event of step 240 was performed on. In another example, the first hardware block may specify the second hardware block based on information (e.g., characteristics of the data packet) determined during the hardware event of step 240. In some embodiments, the first hardware block may specify the second hardware block based also, at least partially, on results from the processor task performed during step 230.

Method 200 may include a query procedure to ensure that the second hardware block is able to receive a packet before step 250 is performed. Such a query procedure may be important if, for example, the second hardware block may only be able to store a finite number of packets due to limited memory capacity. In such an example, the first hardware block may need to verify that the second block can receive the packet before initiating the transfer. In some embodiments, the first block may query the second block to see if it is able to receive a data packet. The second block may, for example, include a finite number of pointers corresponding to its memory capacity, and the first block can try to obtain a pointer before transferring the packet to the second block (e.g., token based flow control). If the first hardware block receives a pointer indicating availability, the block can then transfer the packet to the available location in the second block's memory (e.g., as indicated by the pointer). However, if the second hardware block is not ready to receive a packet, the first hardware block can hold the packet for a predetermined amount of time and then query the second hardware block again.

In some embodiments, method 200 may repeat steps 210 through 250 until a data packet's processing sequence is complete. As the next iteration of method 200 is performed, what was previously considered the second hardware block can be considered the first hardware block and a new second hardware block can be introduced. An apparatus may continue to perform method 200 until a hardware block or a processor indicates that the data packet has been fully processed. For example, an apparatus may continue to perform method 200 until a hardware block transfers the data packet to an output hardware block, indicating that the processing sequence is complete.

In accordance with this disclosure, a data processing sequence may include transferring packet information between a processor and a hardware block at any point during the processing sequence. Interface circuitry (e.g., processor-to-hardware interface circuitry 120) can be used to facilitate transfer of packet information between a processor and a hardware block. For example, method 200 includes, for example, transferring packet information to a processor at step 220, but packet information can be transferred between a processor and a hardware block at any point in method 200. For example, packet information may be transferred to the first hardware block before step 240. In another example, packet information may be transferred to the second hardware block before or after step 250.

A data processing sequence can also include transferring packet information from one hardware block to another hardware block. Interface circuitry (e.g., intra-hardware interface circuitry 140) can be used to facilitate transfer of packet information between hardware blocks. Packet information may be transferred concurrently with or separate from the associated packet. For example, method 200 can include transferring packet information from the first hardware block to the second hardware block before, during, or after step 250. A more detailed discussion of transferring packet information between hardware blocks can be found below in the discussion related to FIG. 4.

Whether from a processor or another hardware block, multiple instances of packet information can be transferred during a data processing sequence. Each instance of packet information may contain different information about the associated packet. In some embodiments, each instance of packet information may be generated in response to a different processor task or hardware event. For example, a processor or a hardware block may generate a first instance of packet information to provide information for the next step in a processing sequence (e.g., parameters for configuring processor task or hardware event). Continuing the example, a processor or a hardware block may generate a second instance of packet information based at least on the next step to provide information for yet a further step. Accordingly, many instances of packet information can be produced as the associated packet goes through a processing sequence.

In accordance with this disclosure, packet information may be transferred to a hardware block before the associated packet has arrived at the hardware block. In such embodiments, a hardware block may store packet information until the associated packet arrives. A hardware block can then use received packet information to configure itself before the associated data packet arrives. For example, the first hardware block may receive packet information before step 240, but the hardware block can configure itself based at least on the received packet information in preparation for the hardware event at step 240. In some embodiments, packet information indicating the type of the associated data packet can be transferred to a hardware block so that it can configure itself in preparation for the data packet's arrival.

Figure 3:
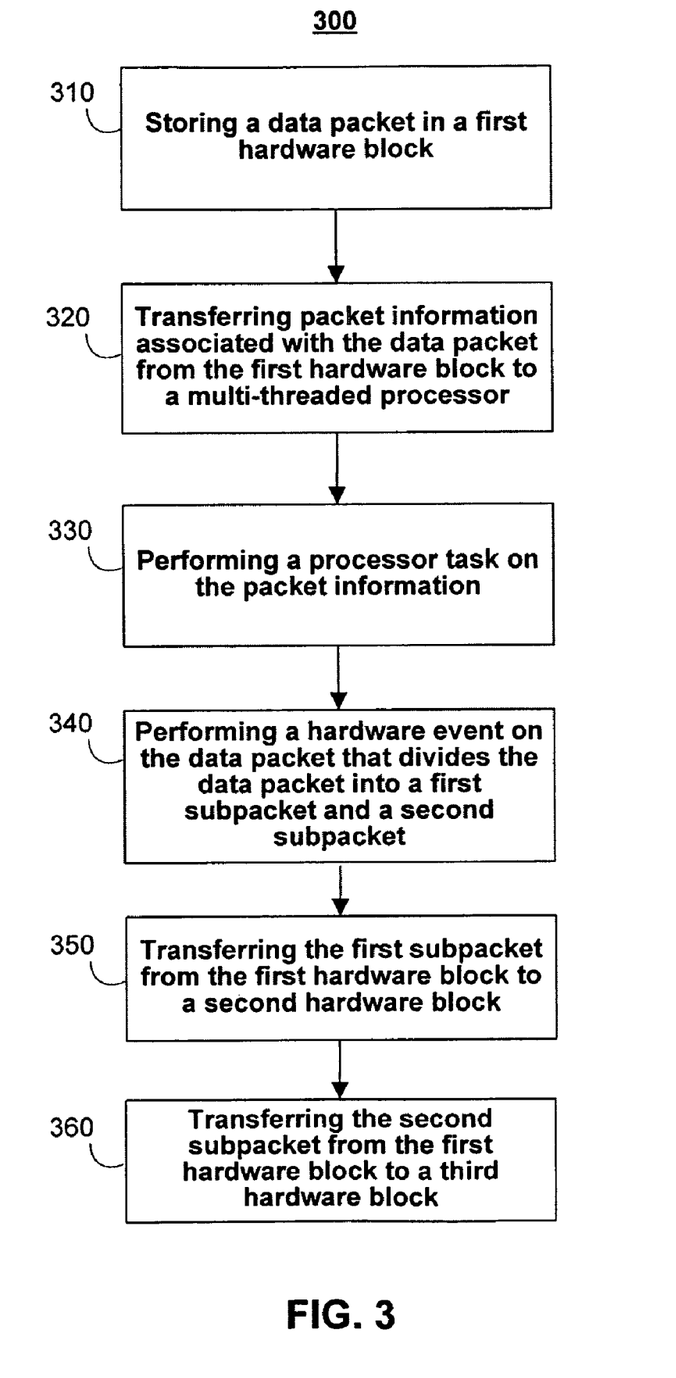
FIG. 3 is a flowchart of a data processing method in accordance with this disclosure.

FIG. 3 shows a flowchart of method 300 for processing a data packet in accordance with this disclosure. Steps 310, 320, and 330 are substantially similar to, respectively, steps 210, 220, and 230. Accordingly, the previous description of the latter can be applied to the former.

At step 340, a hardware event can be performed on a data packet that divides the data packet into a first subpacket and a second subpacket. The hardware event can be performed on the data packet by a hardware block (e.g., one of hardware blocks 130). In addition to dividing the data packet into subpackets, the hardware event performed at step 340 can also include computations or other data manipulation.

As used herein, the term subpacket refers to any data including a portion of a packet. For example, a subpacket may include all data in a packet of a certain type or from a certain source. In some embodiments, a portion of the original packet may be included in two or more subpackets. For example, the header portion of an original packet may be included in all subpackets derived from that packet. In some embodiments, a subpacket may include additional data that was not part of the original data packet. For example, a subpacket may include data identifying the hardware block that created the subpacket. In another example, a subpacket may include data identifying the other subpacket or subpackets that were derived from the same original packet (e.g., to facilitate reassembly of the packet).

In accordance with step 340, dividing a data packet into subpackets may include literally separating each subpacket and storing it in a separate memory register. However, in other embodiments, dividing a data packet into subpackets may include merely identifying the content of each subpacket.

At step 350, the first subpacket can be transferred from the first hardware block to a second hardware block. At step 360, the second subpacket can be transferred from the first hardware block to a third hardware block. In some embodiments, the second hardware block may be chosen based at least on the content or type of the first subpacket, and the third hardware block may be chosen based at least on the content or type of the second subpacket. However, in other embodiments, the second and third hardware blocks may be multiple instances of the same hardware block so that dividing the packet into subpackets allows the subpackets to undergo the same processing sequence in parallel.

In some embodiments, a data processing sequence can include determining if a data packet contains multiple types of data. For example, a processor task or hardware event may include determining what types of data a packet includes. If a packet includes only one type of data, the packet may remain intact for processing. However, if multiple types of data are found, the packet may be divided into two or more subpackets (see, e.g., step 340). For example, a processor task may identify multiple types of data in a packet, and notify a hardware block by transferring packet information to the block. In such an embodiment, the hardware block may then divide the packet into different subpackets, one for each type of data. Dividing the packet into subpackets may allow each of the first data type and the second data type to undergo a different processing sequence. For example, each of different hardware blocks (e.g., the second and third hardware blocks discussed with respect to step 350) may represent the beginning of a different processing sequence for different types of data. As an illustrative example, a data processing apparatus (e.g., apparatus 100) may receive a packet of communications data and determine that the packet includes both video and audio data. The apparatus may then divide the packet into a first subpacket containing audio data and a second subpacket containing video data, and each subpacket may be transferred to a specialized hardware block (see, e.g., steps 350 and 360).

In accordance with this disclosure, method 300 may continue by performing method 200, but treating each of the first and second subpackets as being a distinct packet. For example, each subpacket can undergo further processing that includes processor tasks and/or hardware events. In some embodiments, the subpackets may be rejoined at a later point in the processing sequence. For example, a hardware block may receive both subpackets and rejoin them to output a combined packet. Depending on the application, the processing sequence can then include further processor tasks and hardware events for the combined packet until the processing sequence is complete. In some embodiments, the processing sequence may complete without rejoining all of the individual subpackets and those loose subpackets may be output from the apparatus as new packets.

Figure 4:
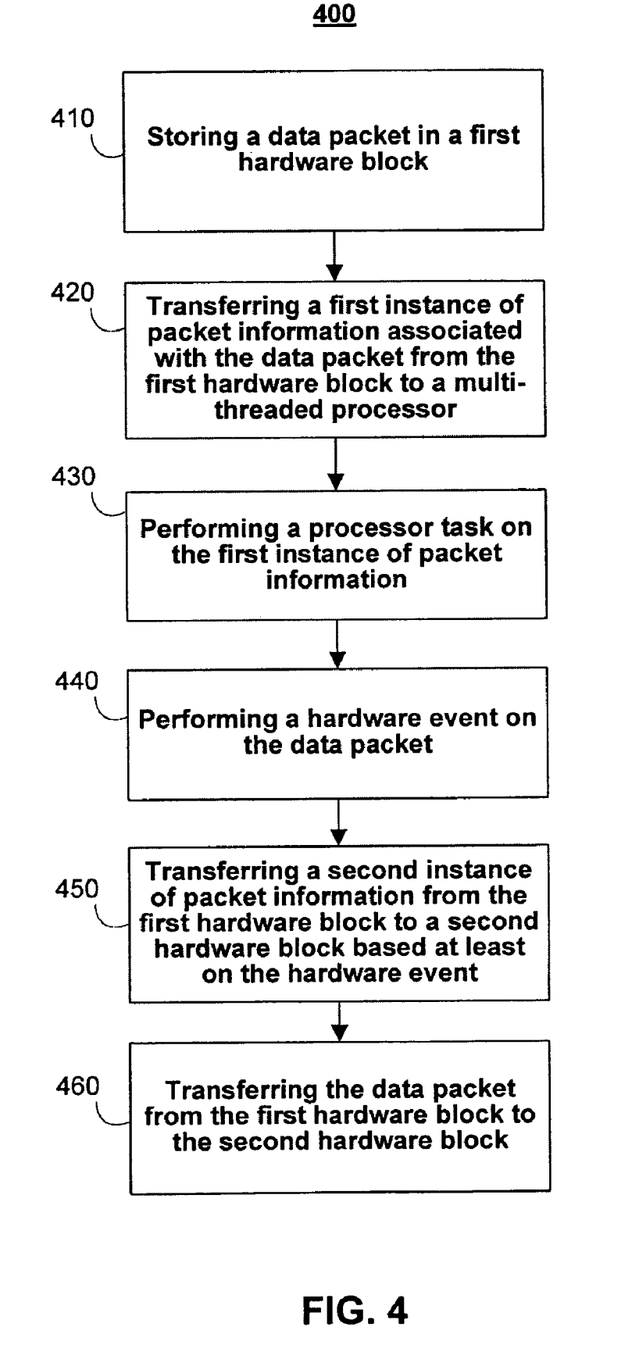
FIG. 4 is a flowchart of a data processing method in accordance with this disclosure.

FIG. 4 shows a flowchart of method 400 for processing a data packet in accordance with this disclosure. Steps 410, 420, 430, and 440 are substantially similar to, respectively, steps 210, 220, 230, and 240. Accordingly, the previous description of the latter can be applied to the former.

At step 450, a second instance of packet information can be transferred from the first hardware block to a second hardware block based at least on the hardware event. For example, a hardware block can generate a second instance of packet information based on the hardware event performed at step 440 and transfer the information to the next hardware block. The next hardware block can then configure itself based on the packet information from the previous hardware block. The packet information can be transferred using an interface coupled to the hardware blocks (e.g., intra-hardware interface circuitry 140).

In accordance with this disclosure, packet information can be transferred from one hardware block to another hardware block at any point during a processing sequence. For example, a first hardware block can transfer packet information to a second hardware block before completing a hardware event being performed on the associated packet. In response to receiving the packet information, the second hardware block can then initiate another hardware event on a different packet or configure itself in preparation for receiving the associated packet from the first hardware event. In some embodiments, a hardware block can transfer packet information that includes a status signal to another hardware block. For example, packet information can include a signal identifying the progress of a hardware event.

At step 460, the data packet can be transferred from the first hardware block to the second hardware block. Step 460 is substantially similar to step 250, and the previous description of the latter can be generally applied to the former. In addition to the previous description of step 250, it is understood that the same interface that was used to transfer packet information from the first hardware block to the second hardware block in step 450 may be used to transfer the data packet between the two hardware blocks in step 460.

In some embodiments, method 400 may repeat steps 410 through 460 until a data packet's processing sequence is complete. As the next iteration of method 400 is performed, what was previously considered the second hardware block can be considered the first hardware block and a new second hardware block can be introduced. An apparatus may continue to perform method 400 until a hardware block or a processor indicates that the data packet has been fully processed. For example, an apparatus may continue to perform method 400 until a hardware block transfers the data packet to an output hardware block, indicating that the processing sequence is complete.

Figure 5:
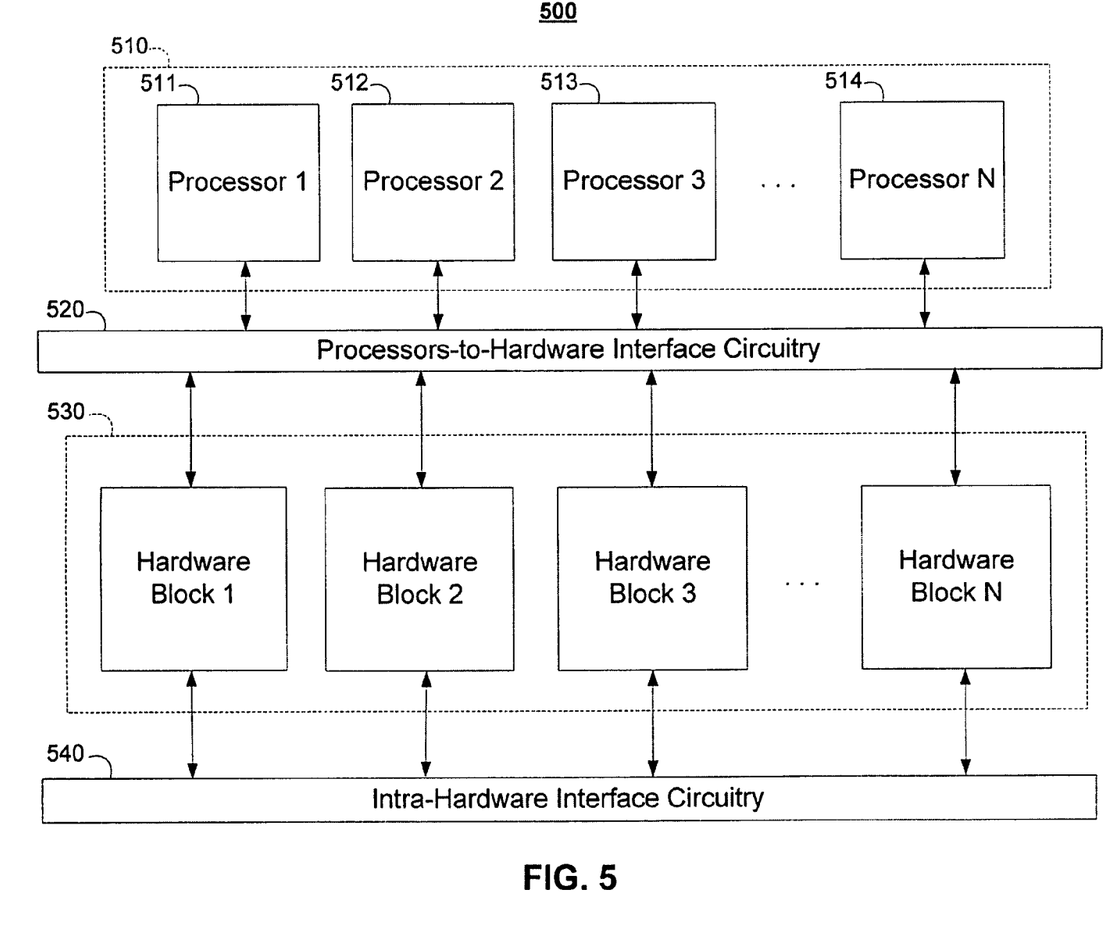
FIG. 5 is a simplified block diagram of a data processing apparatus in accordance with this disclosure.

FIG. 5 shows a block diagram of data processing apparatus 500 in accordance with this disclosure. Apparatus 500 includes processors 510, processors-to-hardware interface circuitry 520, hardware blocks 530, and intra-hardware interface circuitry 540. Hardware blocks 530 and intra-hardware interface circuitry 540 are substantially similar to, respectively, hardware blocks 130 and intra-hardware interface circuitry 140 of apparatus 100. Accordingly, the description of hardware blocks 130 and intra-hardware interface circuitry 140 can be applied, respectively, to hardware blocks 530 and intra-hardware interface circuitry 540.

Processors-to-hardware interface circuitry 520 can be used to control the transfer of packet information between hardware blocks 530 and processors 510. Processors 510 can include any number of multi-threaded processors 511-514 for performing processor tasks. Each of processors 511-514 can be programmed with the same software program such that each processor can perform any of the processor tasks in a processing sequence. Accordingly, pending processor tasks can be dispatched to the first processor with an idle thread.

Interface circuitry 520 may be similar to interface circuitry 120, with some minor changes. For example, interface circuitry 520 can monitor multiple processors to look for idle threads. A person having ordinary skill in the art can see that, once interface circuitry 520 is configured for multiple processors, apparatus 500 is easily scalable by simply increasing the number of processors.

Figure 6:
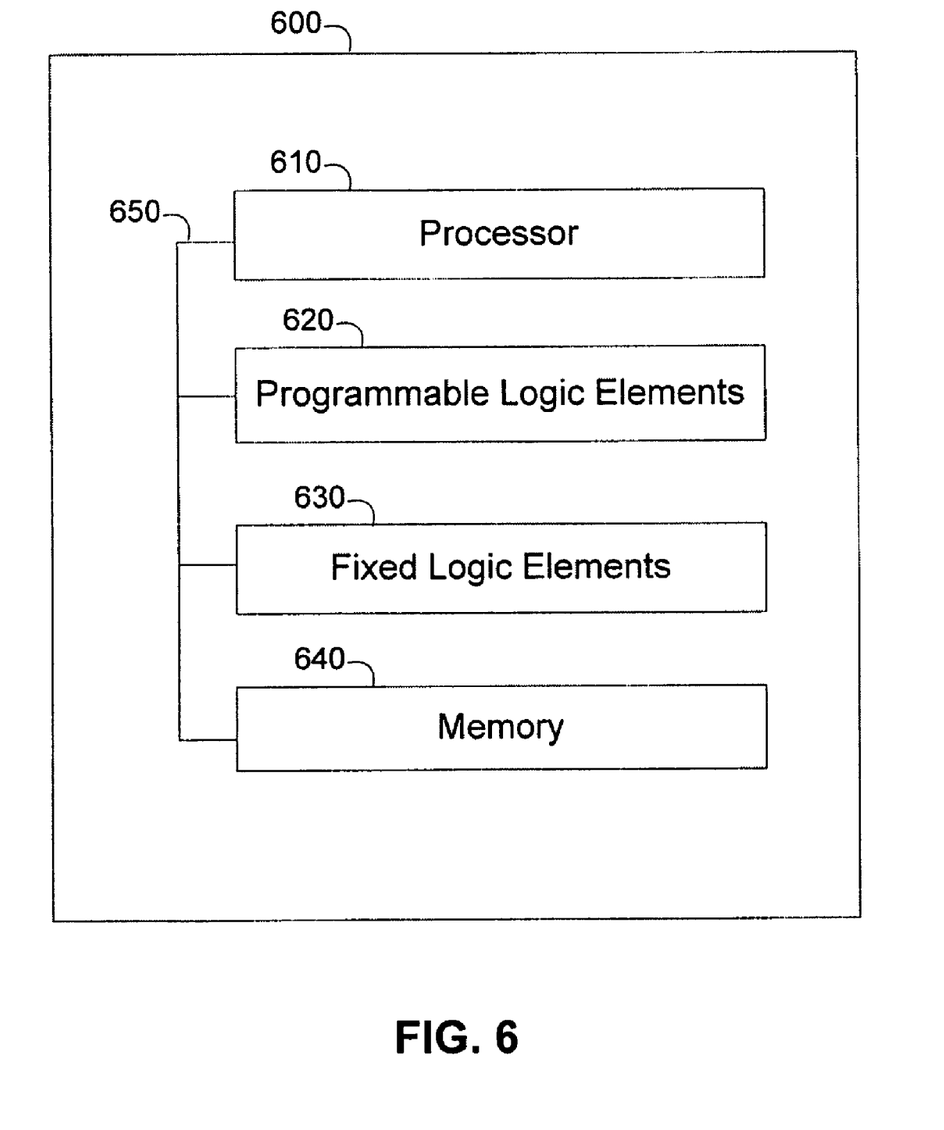
FIG. 6 is a simplified block diagram of a programmable logic device in accordance with this disclosure.

FIG. 6 shows PLD 600 in accordance with this disclosure. PLD 600 can include processor 610, programmable logic elements 620, fixed logic elements 630, memory 640, and programmable interconnect 650. Processor 610 can be any mechanism capable of executing instructions from an instruction set. In some embodiments, processor 610 may include more than one processor mechanism. Processor 610 may be a multi-threaded processor, for example. Programmable logic elements 620 can be any mechanism in a circuit that performs an operation on a given number of input lines to provide one or more outputs according to how the element is programmed. Programmable logic elements 620 can, for example, be configured using elements such as fuses, antifuses, EPROMS, EEPROMS, or static RAM bits. Fixed logic elements 630 can be any circuitry that performs an operation on input lines to provide one or more outputs. While fixed logic elements may not be programmable, they may be faster than programmable logic elements. Memory 640 can be storage circuitry operable to store data. Programmable interconnect 650 can be of the type typically provided in PLDs. For example, programmable interconnect 650 preferably can be coupled to any of the elements of PLD 600 in a fully programmable manner.

PLD 600 can be configured to implement data processing apparatus and methods in accordance with this disclosure. For example, processor 610 can be used to perform processor tasks. Continuing the example, programmable logic elements 620 can be configured to provide one or more programmable hardware blocks (e.g., hardware blocks 130) and interface circuitry (e.g., processor-to-hardware interface circuitry 120 and intra-hardware interface circuitry 140). In this example, the hardware blocks provided by programmable logic elements 620 can be reprogrammed for a different application. Therefore, the hardware blocks formed from programmable logic elements may be reprogrammed to adjust the processing sequence after PLD 600 has been deployed. Moreover, programmable hardware blocks simplify application development for PLD 600 because the programmable hardware blocks are more flexible than fixed hardware blocks.

While some hardware blocks can be provided through programmable logic elements 620, fixed logic elements 630 may still be organized into a predetermined set of hardware blocks (e.g., one or more of hardware blocks 130), each of which may be capable of performing a predetermined hardware event. In some embodiments, PLD 600 may include more than one hardware block capable of performing the same event (e.g., especially if that event is common in data processing sequences).

When configuring PLD 600 to perform a processing sequence, programmable interconnect 650 can be programmed such that any hardware blocks necessary for that sequence (e.g., those corresponding to hardware events that are in the sequence) are connected to the correct programmable logic elements 620. Fixed logic elements 630 may include hardware blocks that are not used in the particular processing sequence implemented in PLD 600. In such a case, those unused blocks may not be connected by interconnect 650 to programmable logic elements 620. Additionally, a software program specifying one or more processor tasks can be loaded into processor 610 when configuring PLD 600 to perform a processing sequence.

Figure 7:
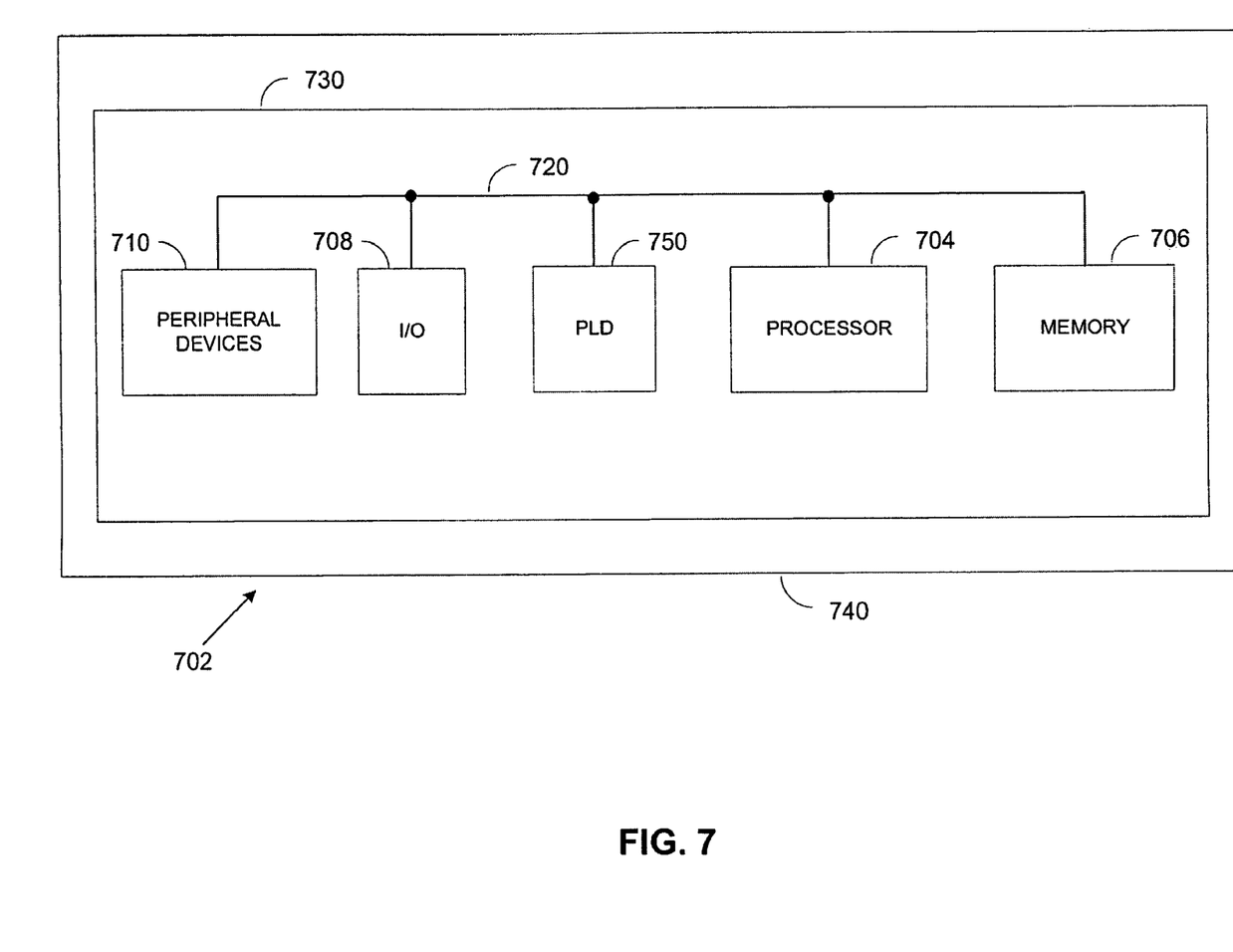
FIG. 7 is a simplified block diagram of an illustrative system employing a data processing apparatus in accordance with this disclosure.

FIG. 7 illustrates a PLD or other circuitry 700 in a data processing system 702 that may incorporate apparatus and methods in accordance with this disclosure. Data processing system 702 may include one or more of the following components: a processor 704; memory 706; I/O circuitry 708; and peripheral devices 710. These components are coupled together by a system bus or other interconnections 720 and are populated on a circuit board 730 (e.g., a printed circuit board), which is contained in an end-user system 740. Any of the physical interconnections between PLD circuitry 750 and any other elements may be made in a manner known to one skilled in the art.

System 702 can be used in a wide variety of applications, such as computer networking, data networking, instrumentation, video processing, digital signal processing, or any other application where the advantage of using programmable or reprogrammable logic is desirable. PLD circuitry 750 may, for example, be used to perform a variety of different logic functions. For example, circuitry 750 can be configured as a processor or controller that works in cooperation with processor 704. Circuitry 750 may also be used as an arbiter for arbitrating access to a shared resource in system 702 (e.g., shared memory). In yet another example, circuitry 750 can be configured as an interface (e.g., interface circuitry) between processor 704 and one of the other components in system 702. It should be noted that system 702 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention, and the present invention is limited only by the claims that follow.

What is claimed is:

1. Apparatus for processing a plurality of successive data packets, wherein each packet includes packet information and undergoes processor tasks and hardware events, the apparatus comprising:
    a multi-threaded processor that is operable to perform processor tasks;
    a plurality of hardware blocks, each of which is operable to perform a hardware event;
    a plurality of memory circuits, each of which is associated with at least one of the hardware blocks and operable to store at least two of the plurality of data packets; and
    first interface circuitry that is operable to control transferring each of the plurality of packets between each of the plurality of memory circuits; wherein:
    the first interface circuitry transfers a first one of the successive data packets from a first one of the memory circuits to the multithreaded processor;

the multithreaded processor performs a processor task on the packet information of the first one of the successive data packets;

the first interface circuitry transfers the first one of the successive data packets, on whose packet information the multithreaded processor performed the processor task, from the multithreaded processor to a second one of the memory circuits, said second one of the memory circuits being associated with a first one of the hardware blocks;

the first one of the hardware blocks performs a hardware event on the first data packet, on whose packet information the multithreaded processor performed the processor task; and based on the hardware event, the first interface circuitry transfers the first one of the successive data packets, on whose packet information the multithreaded processor performed the processor task and on which the first one of the hardware blocks performed the hardware event, from the second one of the memory circuits to a third one of the memory circuits, the third one of the memory circuits being associated with a second one of the hardware blocks.

2. The apparatus of claim 1, wherein each respective one of the hardware blocks is operable to perform a respective hardware event on a packet stored in a respective one of the memory circuits that is associated with the respective one of the hardware blocks.

3. The apparatus of claim 1, wherein:
one of the memory circuits is a shared memory circuit that is associated with at least two of the hardware blocks; and
each respective one of the at least two hardware blocks is operable to perform a respective hardware event on a packet stored in the shared memory circuit.

4. The apparatus of claim 1, wherein:
at least one of the hardware blocks is operable to specify another one of the hardware blocks; and
the first interface circuitry is operable to transfer a packet stored in one of the memory circuit circuits, associated with the at least one of the hardware blocks, to one of the memory circuits associated with the another one of the hardware blocks.

5. The apparatus of claim 1, wherein each respective memory circuit is provided within a respective hardware block with which it is associated.

6. The apparatus of claim 1, wherein the first interface circuitry comprises:
memory operable to store at least two of the plurality of data packets being transferred.

7. The apparatus of claim 1, further comprising:
second interface circuitry that is operable to control transferring packet information associated with one packet of the plurality of packets between the multi-threaded processor and the plurality of memory circuits.

8. A programmable logic device comprising the apparatus as defined in claim 1.

9. The programmable logic device of claim 8 wherein the first interface circuitry and at least one of the hardware blocks are configured from programmable logic of the programmable logic device.

10. A digital processing system comprising:
processing circuitry;
a memory coupled to said processing circuitry; and
a programmable logic device as defined in claim 9 coupled to the processing circuitry and the memory.

11. A printed circuit board on which is mounted a programmable logic device as defined in claim 8.

12. The printed circuit board defined in claim 11 further comprising:
memory circuitry mounted on the printed circuit board and coupled to the programmable logic device.

13. The printed circuit board defined in claim 12 further comprising:
processing circuitry mounted on the printed circuit board and coupled to the memory circuitry.

14. A method for processing a data packet, the method comprising:
storing the data packet in a first hardware block;
transferring packet information associated with the data packet from the first hardware block to a multi-threaded processor;
performing a processor task on the packet information;
performing a hardware event on the data packet; and
transferring the data packet from the first hardware block to a second hardware block based at least on the hardware event.

15. The method of claim 14, wherein the transferring the data packet based at least on the hardware event comprises:
selecting the second hardware block based at least on the hardware event.

16. The method of claim 15, wherein the selecting the second hardware block comprises selecting the second hardware block based at least on the type of the packet on which the hardware event is performed.

17. The method of claim 15, wherein the selecting the second hardware block comprises selecting the second hardware block based at least on the results of the hardware event.

18. The method of claim 14, wherein the method is performed repeatedly until the data packet's processing sequence is complete.

19. A method for processing a data packet, the method comprising:
storing a data packet in a first hardware block;
transferring packet information associated with the data packet from the first hardware block to a multi-threaded processor;
performing a processor task on the packet information;
performing a hardware event on the data packet that divides the data packet into a first subpacket and a second subpacket;
transferring the first subpacket from the first hardware block to a second hardware block; and
transferring the second subpacket from the first hardware block to a third hardware block.

20. The method of claim 19, wherein:
the data packet includes data of a first data type and data of a second data type; and
the hardware event comprises dividing all data of the first data type into the first subpacket and dividing all data of the second data type into the second subpacket.

21. The method of claim 20, wherein:
transferring the first subpacket comprises selecting the second hardware block based at least on the first data type; and
transferring the second subpacket comprises selecting the third hardware block based at least on the second data type.

22. The method of claim 19, further comprising performing a second hardware event on the first subpacket and the second subpacket that rejoins the first subpacket and the second subpacket.

23. A method for processing a data packet, the method comprising:
- storing a data packet in a first hardware block;
- transferring a first instance of packet information associated with the data packet from the first hardware block to a multi-threaded processor
- performing a processor task on the first instance of packet information;
- performing a hardware event on the data packet;
- transferring a second instance of packet information from the first hardware block to a second hardware block based at least on the hardware event; and
- transferring the data packet from the first hardware block to the second hardware block.

24. The method of claim 23, wherein the transferring the second instance of packet information based at least on the hardware event comprises:
- selecting the second hardware block based at least on the hardware event.

25. The method of claim 24, wherein the selecting the second hardware block comprises selecting the second hardware block based at least on the type of the packet on which the hardware event is performed.

26. The method of claim 24, wherein the selecting the second hardware block comprises selecting the second hardware block based at least on the results of the hardware event.

27. The method of claim 23, further comprising:
- storing the second instance of packet information in the second hardware block prior to the transferring the data packet.

28. The method of claim 23, further comprising:
- configuring the second hardware block based at least on the second instance of packet information prior to the transferring the data packet.

* * * * *